(12) United States Patent
Hsieh

(10) Patent No.: US 6,636,163 B1
(45) Date of Patent: Oct. 21, 2003

(54) NUMERIC KEY-BASED CHINESE ADDRESS INPUTTING METHOD

(75) Inventor: Hsien-Fen Hsieh, Taipei Hsien (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 248 days.

(21) Appl. No.: 09/603,357

(22) Filed: Jun. 26, 2000

(30) Foreign Application Priority Data

Jul. 22, 1999 (JP) .......................................... 11-207610

(51) Int. Cl.[7] .............................................. H03M 11/00
(52) U.S. Cl. ......................... 341/28; 400/110; 345/171
(58) Field of Search ...................... 341/28, 23; 400/109, 400/110, 484; 345/171

(56) References Cited

U.S. PATENT DOCUMENTS

| | | | |
|---|---|---|---|
| 5,210,868 A | 5/1993 | Shimada et al. | |
| 5,664,896 A | 9/1997 | Blumberg | |
| 5,857,184 A | 1/1999 | Lynch | |
| 6,005,498 A | * 12/1999 | Yang et al. | 341/23 |
| 6,281,884 B1 | * 8/2001 | Chang et al. | 341/28 |
| 6,307,541 B1 | * 10/2001 | Ho et al. | 341/28 |

FOREIGN PATENT DOCUMENTS

| | | |
|---|---|---|
| CN | 73889 | 1/1986 |
| CN | 73890 | 1/1986 |
| CN | 1069350 | 2/1993 |
| CN | 1073023 | 6/1993 |
| CN | 1118085 | 3/1996 |
| CN | 1166642 | 12/1997 |
| CN | 1167292 | 12/1997 |
| CN | 1196515 | 10/1998 |

OTHER PUBLICATIONS

English Language Abstract of CN 1118085.
English Language Abstract of CN 1073023.
English Language Abstract of CN 1196515.
English Language Abstract of CN 1069350.
English Language Abstract of CN 1167292.
English Language Abstract of CN 1166642.

\* cited by examiner

*Primary Examiner*—Michael Horabik
*Assistant Examiner*—Hung Dang
(74) *Attorney, Agent, or Firm*—Greenblum & Bernstein, P.L.C.

(57) ABSTRACT

A numeric key-based Chinese-language inputting method, which enables the rapid inputting of a Chinese-language address in accordance with using numeric keys includes determining as to a numerical inputting mode, or a single Chinese character inputting mode, or an address inputting mode, and for a numerical inputting mode, processing in accordance with a numerical processing step, and for a single Chinese character inputting mode, processing in accordance with a single Chinese character processing step, and for an address inputting mode, and processing in accordance with an address data processing step. Thereafter, a Chinese-language address, made up of characters and numerals detected in accordance with each step, is outputted to a display portion for visual representation.

7 Claims, 11 Drawing Sheets

Fig. 3

|   | 1 | 2 | 3 | 4 | 5 | 6 | 7 | 8 | 9 |
|---|---|---|---|---|---|---|---|---|---|
| 1 | ㄅ | ㄉ | ㄍ | ㄐ | ㄓ | ㄗ | ㄧ | ㄚ | ㄞ |
| 2 | ㄆ | ㄊ | ㄎ | ㄑ | ㄔ | ㄘ | ㄨ | ㄛ | ㄟ |
| 3 | ㄇ | ㄋ | ㄏ | ㄒ | ㄕ | ㄙ | ㄩ | ㄜ | ㄠ |
| 4 | ㄈ | ㄌ | ˇ | ˋ | ㄖ |   |   | ㄝ | ㄡ |
| 5 | ˉ | ˊ |   |   | ˙ |   |   |   | ㄢ |
| 6 |   |   |   |   |   |   |   |   | ㄣ |
| 7 |   |   |   |   |   |   |   |   | ㄤ |
| 8 |   |   |   |   |   |   |   |   | ㄥ |
| 9 |   |   |   |   |   |   |   |   | ㄦ |

Fig. 4

|  | VOCALIZATION SYMBOL CODE STRING | CHINESE-LANGUAGE CHARACTER |
|---|---|---|
|  | ⋮ | ⋮ |
|  | ⋮ | ⋮ |
| (ㄅㄟˇ) | 112943 | 北 |
| (ㄅㄟˋ) | 112944 | 被 |
|  | ⋮ | 背 |
|  | ⋮ | ⋮ |
| (ㄊㄞˊ) | 221942 | 台 |
|  | ⋮ | 擡 |
|  | ⋮ | ⋮ |
|  | ⋮ | ⋮ |
| (ㄕˋ) | 3544 | 市 |
|  | ⋮ | 是 |
|  | ⋮ | ⋮ |
|  | ⋮ | ⋮ |

Fig. 5

| | | ADDRESS CODES | ADDRESS CHARACTERS | SUBSEQUENT SEARCH RANGE |
|---|---|---|---|---|
| 0 ↑ | | 123722 | 釣魚台 | $A_1 \sim A_2$ |
| | | 133434 | 高雄県 | $A_2 + 1 \sim A_3$ |
| | | ⋮ | ⋮ | ⋮ |
| PROVINCE-CITY DATA AREA | | 221134 | 台北県 | $A_{12} + 1 \sim A_{13}$ |
| | | 221135 | 台北市 | $A_{13} + 1 \sim A_{14}$ |
| | | ⋮ | ⋮ | ⋮ |
| | | 374234 | 雲林県 | $A_{26} + 1 \sim A_{27}$ |
| | | 421434 | 連江県 | $A_{27} + 1 \sim A_{28}$ |
| $A_1, A_2$ ↓ | | 1237224237 | 釣魚台列嶼 | $A_{28} + 1 \sim A_{29}$ |
| $A_2 + 1$ | | 123534 | 大社郷 | $A_{29} + 1 \sim A_{30}$ |
| | | ⋮ | ⋮ | ⋮ |
| | | 452734 | 仁武郷 | $A_i \sim A_{i+1}$ |
| | | ⋮ | ⋮ | ⋮ |
| $A_{12} + 1$ CITY-TOWN-VILLAGE DATA AREA | | 112435 | 板橋市 | $A_j \sim A_{j+1}$ |
| | | ⋮ | ⋮ | ⋮ |
| $A_{13}$ | | 454115 | 瑞芳鎮 | $A_k \sim A_{k+1}$ |
| | | ⋮ | ⋮ | ⋮ |
| | | 1113 | 北竿 | $A_l \sim A_{l+1}$ |
| | | 1217 | 東引 | $A_{l+1} + 1 \sim A_{l+2}$ |
| | | 1413 | 莒光 | $A_{l+2} + 1 \sim A_{l+3}$ |
| | | 3213 | 南竿 | $A_{l+3} + 1 \sim A_{l+4}$ |
| $A_{29} + 1$ | | 113534 | 北勢巷 | NULL |
| | | ⋮ | ⋮ | NULL |
| | | ⋮ | ⋮ | NULL |
| $A_{30}$ | | 25319912 | 澄観二段 | NULL |
| | | ⋮ | ⋮ | NULL |
| | | ⋮ | ⋮ | NULL |
| ROAD-STREET-LANE-ALLEY DATA AREA | | 173542 | 英士路 | NULL |
| | | ⋮ | ⋮ | NULL |
| | | ⋮ | ⋮ | NULL |
| $A_{l+3} + 1$ | | 141626 | 経澤村 | NULL |
| | | ⋮ | ⋮ | NULL |
| | | ⋮ | ⋮ | NULL |
| $A_{l+4}$ ↓ | | 451926 | 仁愛村 | NULL |

Fig. 12

| 1 | 2 ´ | 3 ˇ | 4 ` | 5 • [-] |
|---|---|---|---|---|
| ㄧ ㄅ ㄆ ㄇ ㄈ | ㄦ ㄉ ㄊ ㄋ ㄌ | ㄣ ㄍ ㄎ ㄏ | ㄐ ㄑ ㄒ ㄩ ㄝ | ㄓ ㄔ ㄕ ㄖ ㄨ |
| i b p m f | er d t n- l | s(z)- an g- k h- | j-i ch-i sh-i ju iu-e | j(r) ch(r) sh(r) r- u |

| 6 | 7 | 8 | 9 | 0 |
|---|---|---|---|---|
| ㄘ ㄗ ㄠ ㄡ | ㄥ ㄤ ㄛ ㄜ | ㄚ ㄟ | ↓ | ↑ |
| ts(z) ai tz ou au | -(e)ng -(e)n ang -o -e | -a ei | | |

NUMERIC KEY-BASED CHINESE ADDRESS INPUTTING METHOD

BACKGROUND OF THE INVENTION

1. Field of the Invention

The present invention relates to a Chinese-language address inputting method for rapidly inputting a Chinese-language address by using 10 numeric keys "0" to "9".

2. Description of the Prior Art

When a multidisciplinary company expecting to acquire business opportunities via advertising, sends out direct mail advertisements and leaflets by mail, it is important to prepare basic customer data. For this reason, when sending direct mail and leaflets by mail, utilizing the already-known characteristics of databases has become an important task from the standpoint of easily and quickly inputting a desired address.

Large numbers of Chinese-language inputting methods and devices, which make use of keyboards, are being developed and marketed these days. Among the methods for inputting Chinese characters via keyboards like this, there is a Chinese character typeface-based inputting method, and a Chinese character reading-based inputting method. As an example of a Chinese character typeface-based inputting method, the Ts'ang-ge inputting method can be cited, and as an example of a Chinese character reading-based inputting method, the Han-yin inputting method can be cited. In methods that use keyboards like this, regardless of whether it is a Ts'ang-ge inputting method, or a Han-yin inputting method, in addition to the 26 English alphabetic keys on practically all general-purpose computer keyboards, notations, such as typeface or vocalization symbols, are assigned to numeric keys, and special symbol keys. FIG. 11 shows an example of such key assignments.

Further, a "Numeric Key-based Chinese Character Voice Inputting Method" disclosed in Republic of China Patent No. 73889, and a "Chinese-Language Inputting Method In Accordance With Western-style Romanized Character Notations Using Numeric Keys" disclosed in Republic of China Patent No. 73890 are also Chinese character reading-based inputting methods. In these two Chinese patents, Pinyin symbols, which are Chinese-language vocalization symbols, and phonetic symbols are assigned to eight numeric keys, for example, to key "1" through key "8", of a numeric keypad on the right side of a keyboard. FIG. 12 shows the key assignments of the numeric keypad in these two patents. Accordingly, two numeric codes are assigned to each vocalization symbol. For example, "11" represents either the vocalization symbol "—" hereinbelow, or the Pinyin symbol "i", and "12" represents either the vocalization symbol "ㄅ", or the Pinyin symbol "b".

The problems explained hereinbelow are found in the above-mentioned prior art. That is, when a Chinese-language address is to be inputted, the characters must be inputted one at a time. Since each character is associated with a plurality of key signals, inputting is both time consuming and troublesome. For example, when "台北県 (Taipeihsien)" is to be inputted using a general-purpose computer keyboard, under conditions that do not take into consideration problems such as word boundary detection, homonyms, and terminology, in accordance with a Han-yin inputting method, this requires ten operations, and in accordance with the patents of Republic of China Patent No. 73889 and Republic of China Patent No. 73890, this requires seventeen operations.

For most Chinese-language inputting methods, other keys must also be used in addition to the numeric keys "0" to "9". For this reason, the Chinese-language inputting methods cannot be applied to devices, the numeric keys of which constitute the ten keys "0" to "9".

There are also a plurality of inputting methods, which enhance conversion accuracy by using a dictionary of commonly used words, but none have been produced using the peculiar attributes of an address. This is because place names and province names are not normally commonly used words. Consequently, for the user, the inputting of an address is apt to become a great burden.

SUMMARY OF THE INVENTION

With the foregoing problems in view, it is an object of the present invention to provide a numeric key-based Chinese-language inputting method, which enables the rapid inputting of a Chinese-language address in accordance with using numeric keys "0" to "9".

To accomplish the foregoing object, the present invention provides a Chinese-language address inputting method for execution by using a device, which comprises a memory portion, a display portion, and a numeric keypad, for inputting a Chinese-language address through numeric keys, which method comprises the following steps.

Inputting Step: Either inputs a Chinese-language address, a single Chinese character, or a numeral, or controls the input mode, in accordance with an input convention, which calls for assigning all Chinese-language vocalization symbols to numeric keys, and with the exception of making a certain key a control key, assigning consonants to six keys, assigning vowels to one key, assigning rhythm to two keys, and assigning five tonal symbols to five consonant keys, respectively.

Controlling Step: Determines, in accordance with a user inputted signal, a numerical inputting mode, or a single Chinese character inputting mode, or an address inputting mode, and performs control such that for a numerical inputting mode, processing is performed in accordance with a numerical processing step, and for a single Chinese character inputting mode, processing is performed in accordance with a single Chinese character processing step, and for an address inputting mode, processing is performed in accordance with an address data processing step.

Numerical Processing Step: Outputs to the display portion as a single numeral a numeric key signal for which the same key is inputted two times in succession.

Single Chinese Character Processing Step: Stores in the memory portion a key signal/vocalization symbol lookup table created in accordance with the above-mentioned input convention, references this key signal/vocalization symbol lookup table each time two numeric keys are inputted in succession, and detects, and then outputs to the display portion a corresponding vocalization symbol, and when a tonal symbol is detected, references a character dictionary stored in the memory portion, and detects, and then outputs to the display portion a Chinese-language character, which corresponds to the above-mentioned inputted vocalization symbol string.

Address Data Processing Step: References, in accordance with successively user inputted key signals and a set hierarchical relationship, an address database stored in the memory portion, and detects, and then outputs to the display portion a corresponding address character string.

Outputting Step: Outputs and displays on the display portion a Chinese-language address comprising the characters and numerals detected in accordance with each of the above-mentioned steps.

It is desirable that the input convention in the above-mentioned inputting step is such as shown in FIG. 2, and that the key signal/vocalization symbol lookup table in the above-mentioned single Chinese character processing step is such as shown in FIG. 3.

It is also desirable that the character dictionary structure in the above-mentioned single Chinese character processing step comprise vocalization symbol code strings and Chinese-language characters as shown in FIG. 4, and, as for the vocalization symbol code thereof, that the vocalization symbol of this corresponding Chinese-language character comprise two numerals in accordance with the above-mentioned input convention.

Again, it is desirable that the hierarchical relationship utilized in the above-mentioned address data processing step divide a Chinese-language address into a subordinate relationship, such as province-city, city-town-village, and road-street-lane-alley, and the like, and that a desired Chinese-language address be detected in accordance with the relationship thereof.

Further, it is desirable that the structure of the address database utilized in the above-mentioned address data processing step constitute address codes, address characters, and subsequent search ranges as shown in FIG. 5, that the above-mentioned address code constitute two numeric codes, which represent the first vocalization symbol of each Chinese-language character in a Chinese-language character string of a desired address, that an address character be a Chinese-language character string of a desired address, and that a subsequent search range define a hierarchical relationship.

According to the above-described constitution, an inputting step either inputs a Chinese-language address, a single Chinese character, or a numeral, or controls the input mode, in accordance with an input convention, which calls for assigning all Chinese-language vocalization symbols to numeric keys, and with the exception of making a certain key a control key, assigning consonants to six keys, assigning vowels to one key, assigning rhythm to two keys, and assigning five tonal symbols to five consonant keys, respectively. A controlling step determines, in accordance with a user inputted signal, a numerical inputting mode, or a single Chinese character inputting mode, or an address inputting mode, and performs control such that for a numerical inputting mode, processing is performed in accordance with a numerical processing step, and for a single Chinese character inputting mode, processing is performed in accordance with a single Chinese character processing step, and for an address inputting mode, processing is performed in accordance with an address data processing step. A numerical processing step outputs to the display portion as a single numeral a numeric key signal for which the same key is inputted two times in succession. A single Chinese character processing step stores in the memory portion a key signal/vocalization symbol lookup table created in accordance with the above-mentioned input convention, references this key signal/vocalization symbol lookup table each time two numeric keys are inputted in succession, and detects, and then outputs to the display portion a corresponding vocalization symbol, and when a tonal symbol is detected, references a character dictionary stored in the memory portion, and detects, and then outputs to the display portion a Chinese-language character, which corresponds to the above-mentioned inputted vocalization symbol string. An address data processing step references, in accordance with successively user inputted key signals and a set hierarchical relationship, an address database stored in the memory portion, and detects, and then outputs to the display portion a corresponding address character string. An outputting step outputs and displays on the display portion a Chinese-language address comprising the characters and numerals detected in accordance with each of the above-mentioned steps.

Therefore, according to the present invention, an input code of two numerals is assigned to each vocalization symbol. For example, "22" is used to represent the vocalization symbol "ㄊ", "11" is used to represent the vocalization symbol "ㄅ", and "35" is used to represent the vocalization symbol "ㄗ".. At the same time, because the first vocalization symbol in each Chinese-language character is treated as a search key, when attempting to detect the Chinese-language character string "台北県" for example, this character string can be detected from the above-mentioned address database simply by inputting the six keys "221134".

The address database is constructed by making use of the characteristics of an address hierarchical structure. For example, in Taiwan, in addition to dividing the country into 27 provincial and metropolitan areas based on administrative zones, each province and metropolitan area is further divided into cities, towns and villages. And each of these cities, towns, and villages is then further divided into roads, streets, lanes and alleys. This hierarchical relationship of addresses is shown in FIG. 10. If explained with regard to inputting the province "台北県" as mentioned above, 10 keys must be pressed with the Han-yin inputting method, and 17 keys must be used with the numeric key-based Chinese character voice inputting method, but with the present invention, only 6 keys are used.

Because the Chinese-language address inputting method of the present invention only uses the 10 numeric keys of 0–9, it is applicable to all devices that have the 10 numeric keys 0–9, regardless of whether that device is the general-purpose keyboard of a desktop computer, a notebook computer, or the like, the soft keyboard of a personal data assistant (PDA), the keypad of mobile communications equipment, for example, either an ordinary telephone, or a cordless phone, or the remote controller that operates a television set. According to the present invention, it is possible to reduce the time required to input Chinese-language address data.

BRIEF DESCRIPTION OF THE DRAWINGS

The present invention will become readily understood from the following description of a preferred embodiment thereof made with reference to the accompanying drawings, in which like parts are designated by like reference numeral and in which:

FIG. 3 is a correspondence chart showing the contents of a key signal/voice symbol lookup table in the above-mentioned aspect of the embodiment;

FIG. 4 is a diagram of the structure of character dictionary data in the above-mentioned aspect of the embodiment;

FIG. 5 is a diagram showing the structure of an address database in the above-mentioned aspect of the embodiment;

FIG. 12 is a diagram displaying the layout of vocalization symbols and tonal symbols of a numeric pad in Republic of China Patent No. 73890, which is another conventional example.

DETAILED DESCRIPTION OF THE PREFERRED EMBODIMENT

Figure 1:
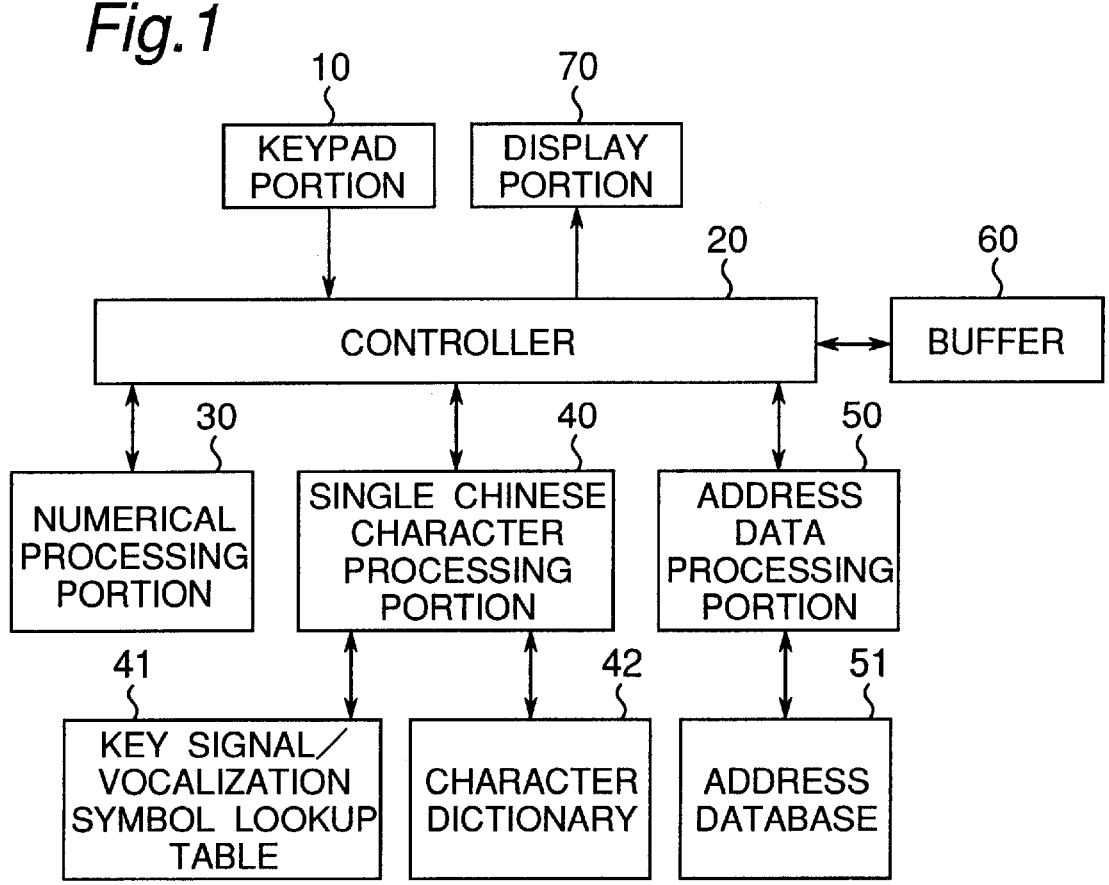
FIG. 1 is a block diagram of the system in a first aspect of the embodiment of the present invention.
Figure 2:
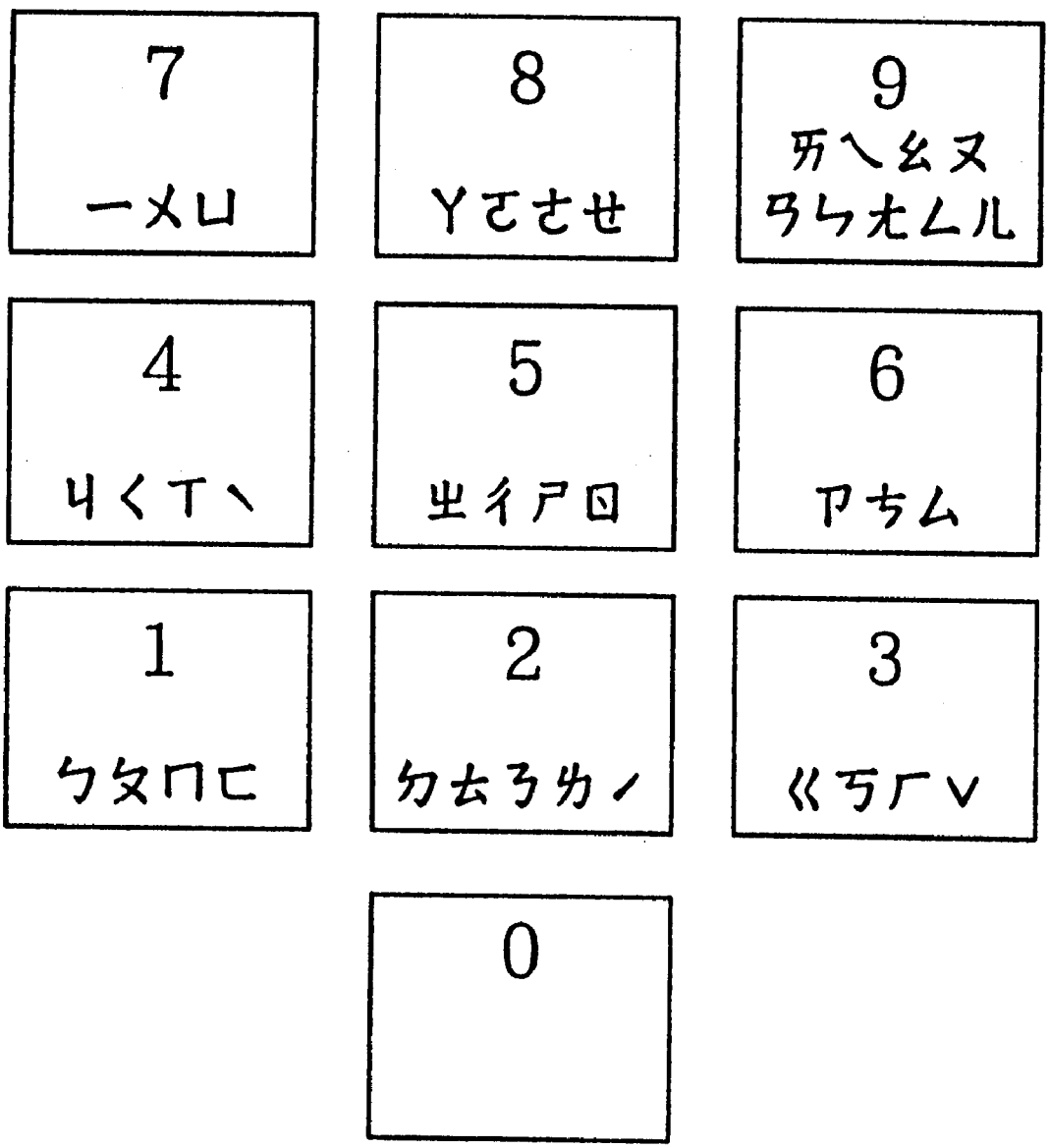
FIG. 2 is a diagram displaying the layout of vocalization symbols and tonal symbols in a numeric keypad of the above-mentioned aspect of the embodiment.

FIG. 1 is a block diagram of the system of an aspect of the embodiment of the present invention. In FIG. 1, reference numeral 10 is a keypad for enabling the inputting of key signals. The arrangement of vocalization symbols and tonal symbols in this numeric keypad is shown in FIG. 2. A diagram of the input keys corresponding to each vocalization symbol is shown in FIG. 3.

Reference numeral 70 is a display portion for displaying Chinese-language characters, or numerals. For example, the display portion comprises either an ordinary computer cathode ray tube display, or a liquid crystal display, or the like. Reference numeral 60 is a buffer, which comprises a memory device such as random access memory, and which stores information temporarily.

Reference numeral 20 is a controller for controlling the flow of data processing using a program stored in the memory portion. For example, the controller fetches a key signal from either the keypad, or from the buffer, and, in accordance with the type and instruction of this signal, controls the corresponding processing portion, causing the corresponding processing to be performed. In this aspect of the embodiment, there are five input modes. If the key signal is "01", it indicates the mode for inputting a province or city, if it is "02", it indicates the mode for inputting a city, town, or village, and if it is "03", it indicates the mode for inputting a road, street, lane or alley. The above-mentioned three types of modes are also called address inputting modes. And key signal "04" is the numerical inputting mode, and key signal "05" is the single Chinese character inputting mode.

Reference numeral 30 is a numerical processing portion for converting to a numeral a key signal, for which the same key is inputted two times in succession, and for outputting the numeral to the display portion. Reference numeral 41 is a key signal/voice symbol lookup table for storing in the memory portion key signals corresponding to 37 Chinese-language vocalization symbols, and five tonal symbols, that is, "—" (Tone 1), "台北県," (Tone 2), "V" (Tone 3), "台北県" (Tone 4), and "·" (Soft tone). The contents corresponding thereto are shown in FIG. 3. For example, input code "11" represents the above-mentioned "ㄅ", "39" represent "ㄡ", and "44" represents "台北県".

Reference numeral 42 is a character dictionary for storing in the memory portion vocalization symbol code strings, and Chinese-language characters corresponding thereto. A schematic diagram of the data structure thereof is shown in FIG. 4. Reference numeral 40 is a single Chinese character processing portion for referencing the key signal/voice symbol lookup table 41, converting an inputted key signal to a Chinese-language vocalization symbol, and outputting the same to the display portion, and then referencing the character dictionary 42, and converting a Chinese-language vocalization symbol string to a Chinese character.

Reference numeral 51 is an address database for storing address codes, address characters, and subsequent search ranges, as shown in FIG. 5. Reference numeral 50 is an address data processing portion for referencing the address database 51, and detecting a corresponding address character string in accordance with an inputted key signal, and a set hierarchical relationship.

Figure 6:
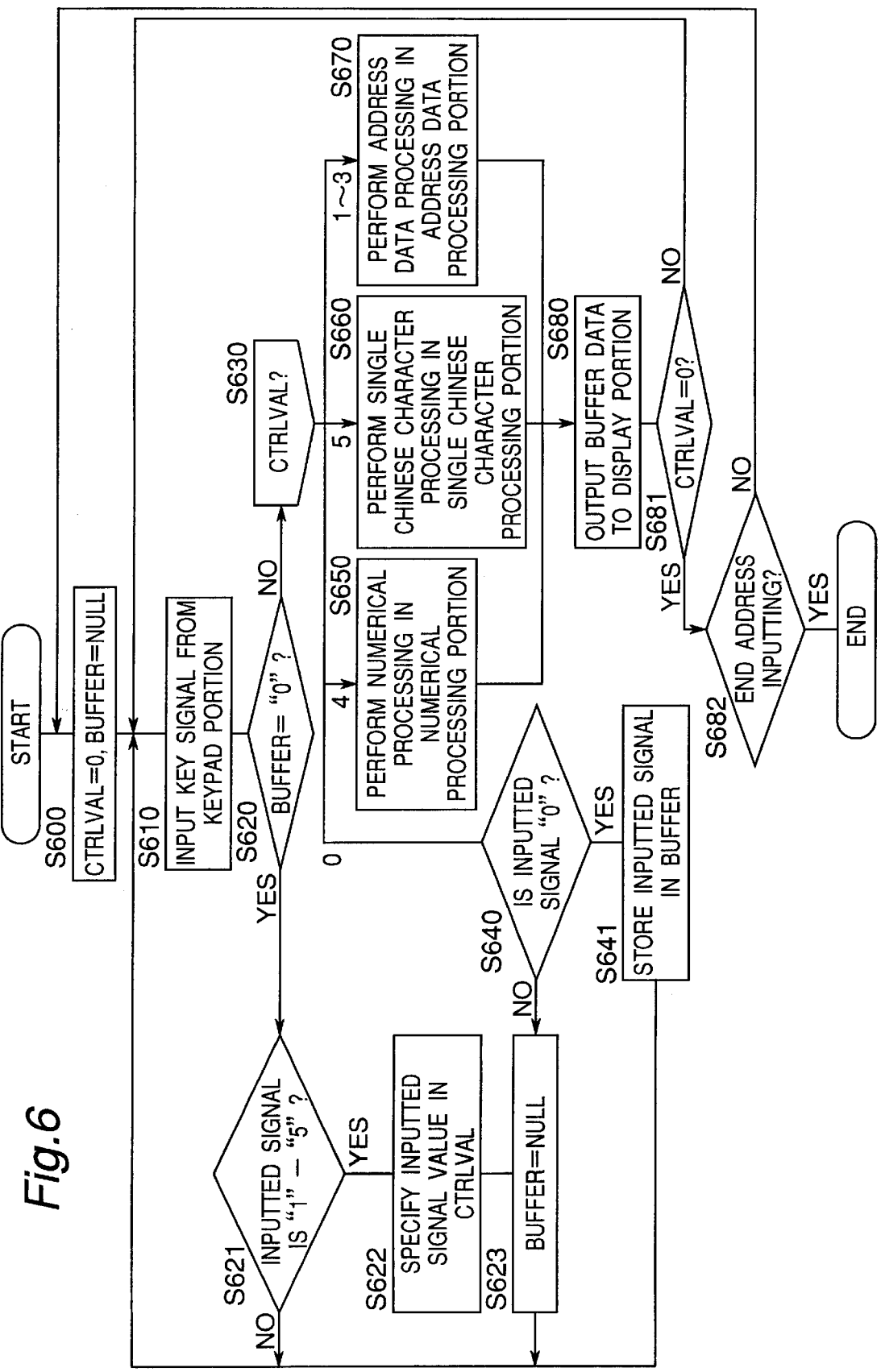
FIG. 6 is a flowchart for a controller in the above-mentioned aspect of the embodiment.

Here, the processing flow of the controller 20 will be explained by referring to the flowchart of FIG. 6. In Step S600, initialization is performed, that is, register CtrlVal is set to 0, and the buffer is set to NULL. In Step S610, a key signal is inputted from the keypad 10. In Step S620, a determination is made as to whether or not the value in the buffer is 0. If it is "0", the program flow proceeds to Step S621, and a determination is made as to whether the inputted signal is "1", or "2", or "3", or "4", or "5". If it is any of the above, the program flow proceeds to Step S622.

In Step S622, the inputted value is specified in CtrlVal. At this time, the above-mentioned specified value is a value of any of 1–5. Then, in Step S623, the buffer is set to NULL, and the program flow returns to Step S610. If, in Step S621, it is determined that the inputted signal is not a value of any of "1"–"5", the program flow immediately returns to Step S610, and a signal is once again received from the keypad. If, in Step S620, it is determined that the value in the buffer is not "0", the program flow moves to Step S630, and a determination is made concerning the value of CtrlVal. If CtrlVal is 0, the program flow enters Step S640.

In Step S640, a determination is made as to whether or not the inputted signal is 0. If it is "0", the program flow proceeds to Step S641, and the inputted signal is stored in the buffer. If it is determined that the inputted signal is not 0, the program flow moves to Step S623. After setting the buffer to NULL in Step S623, the program flow returns to Step S610. In Step S630, if it is determined that the value of CtrlVal is 4, the program flow moves to the numerical processing portion of Step S650, and numerical processing is performed. In Step S630, if it is determined that the value of CtrlVal is 5, the program flow moves to the single Chinese character processing portion of Step S660, and single Chinese character processing is performed.

If the value of CtrlVal is any of "1" to "3", the program flow moves to the address data processing portion of Step S670, and address data processing is performed. After completing the processing of Steps S650, S660, S670, the program flow moves to Step S680, and the processing results thereof are outputted to the display portion 70. Next, the program flow moves to Step S681, and a determination is made concerning the value of CtrlVal. If the value of CtrlVal is 0, the program flow moves to Step S682, and a determination is made as to whether or not address inputting has ended. If it is determined that address inputting is finished, the program flow moves to the end step. Here, the address data inputting of 1 record is complete.

When the determination of Step S681 is that address inputting is still not done, this indicates that only a certain numeral, or a certain single Chinese character, or a portion of an address has been inputted. In this case, the program flow returns to Step S600, and the inputting of another numeral, single Chinese character, or address data must be carried out. If, in Step S681, the value of CtrlVal is not 0, the program flow returns to Step S610, and a key signal is once again inputted from the keypad. Thereafter, data inputting and processing are performed.

Figure 7:
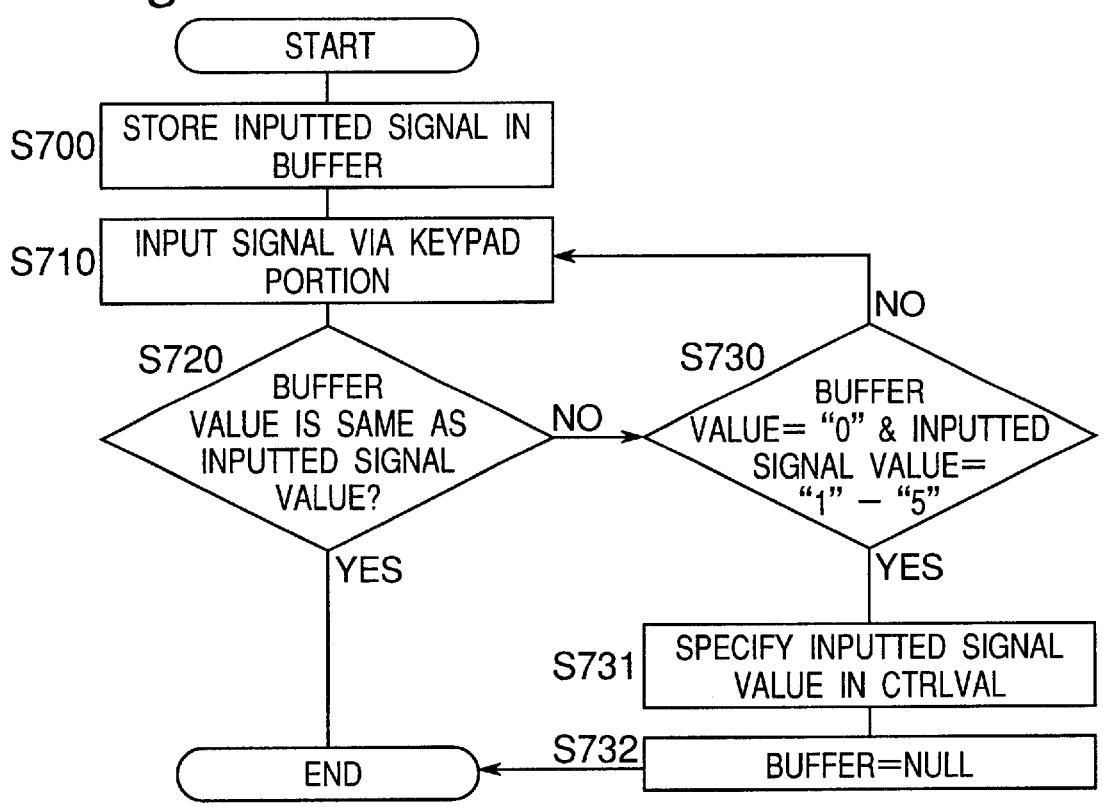
FIG. 7 is a flowchart for a numeric processing portion in the above-mentioned aspect of the embodiment.

Here, the processing flow of the numerical processing portion 30 will be explained by referring to the flowchart of FIG. 7. After storing an inputted signal in the buffer in Step S700, the program flow proceeds to Step S710. In Step S710, a signal is inputted in accordance with the keypad 10. In Step S720, a determination is made as to whether or not the value in the buffer is the same as the value of the inputted signal. When it is the same, this indicates that a numeral was inputted. For example, when the value inside the buffer 60 is "1", if a signal "1" is inputted once again at this time, it signifies that the numeral "1" is to be inputted.

If the value in the buffer 60 is not the same as the value of the inputted signal, the program flow proceeds to Step S730. In Step S730, a determination is made as to whether the value in the buffer is "0", and the value of the inputted signal is a value of "1"–"5". If this is so, the program flow proceeds to Step S731. In Step S731, after specifying the inputted signal value to CtrlVal, the program flow proceeds to Step S732, and the buffer 60 is set to NULL. Then, numeric inputting is ended, and the system switches to another inputting mode. Otherwise, the program flow returns to Step S710, and a numeral is inputted once again.

Figure 8:
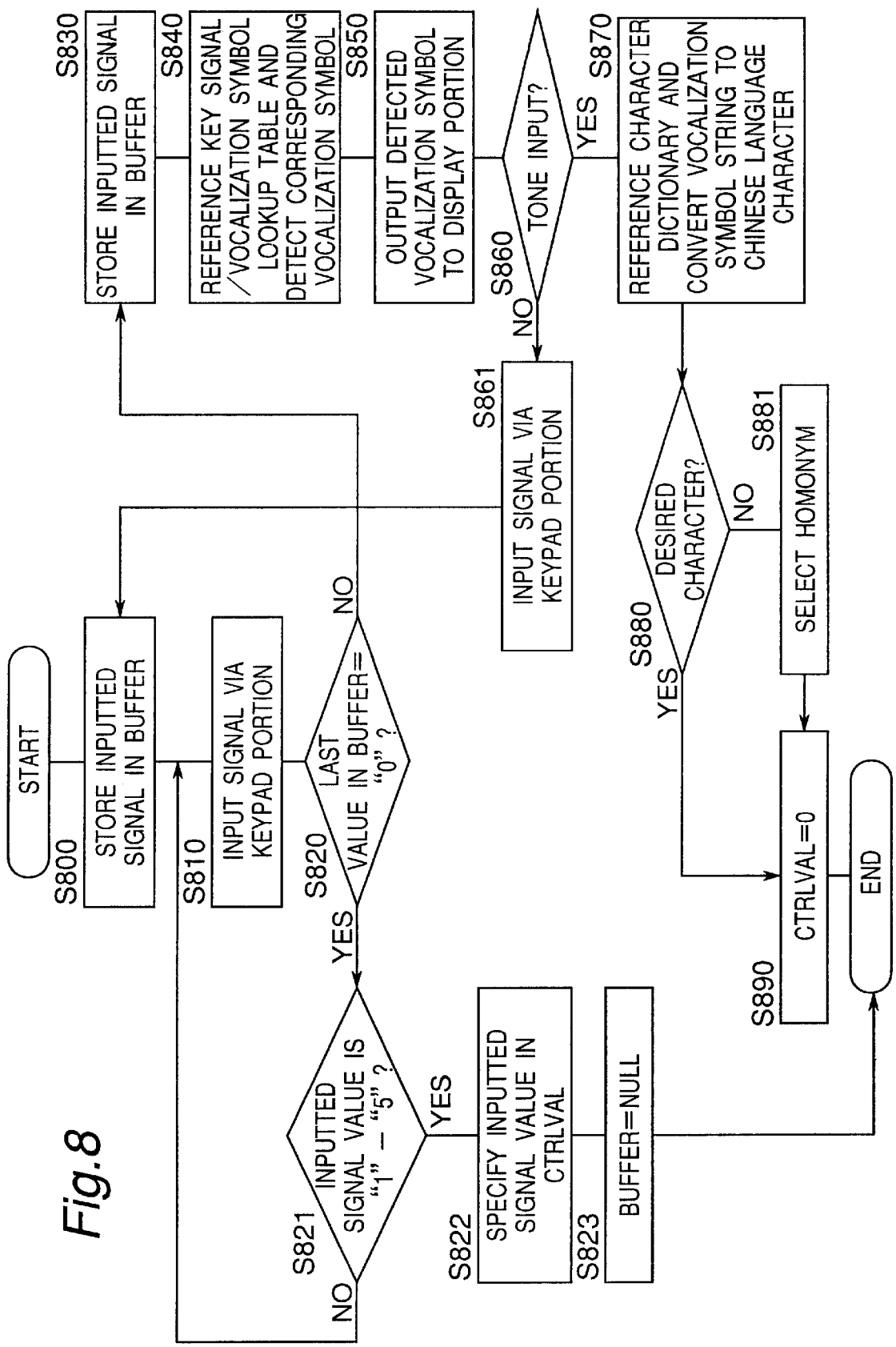
FIG. 8 is a flowchart for a single Chinese character processing portion in the above-mentioned aspect of the embodiment.

Here, the processing flow of the single Chinese character processing portion 40 will be explained by referring to the flowchart of FIG. 8. After storing an inputted signal in the buffer 60 in Step S800, the program flow proceeds to Step S810. In Step S810, a signal is inputted in accordance with the keypad 10. In Step S820, a determination is made as to whether or not the last value in the buffer 60 is "0". If it is 0, the program flow proceeds to Step S821, and a determination as to whether the value of the inputted signal is a value of "1" to "5". If so, after specifying the value of the inputted signal in CtrlVal in Step S822, the program flow moves to Step S823, and NULL is set in the buffer 60. Then, single Chinese character inputting ends, and the system switches to another inputting mode.

In Step S821, when the value of the inputted signal is not any of "1" to "5", the program flow returns to Step S810, and a signal is inputted once again from the keypad 10. If, in Step S820, the last value in the buffer 60 is not "0", the program flow moves to Step S830, and the inputted signal is stored in the buffer 60. Thereafter, in Step S840, a corresponding vocalization symbol is detected by referencing the key signal/voice symbol lookup table. If the inputted key signal does not conform to the input convention, when the inputted signal key is "61", for example, the detection result thereof is treated as a null character string. In Step S850, the detected vocalization symbol is outputted to the display portion 70 and displayed.

Thereafter, in Step S860, a determination is made as to whether or not the detected vocalization symbol is a tone. If it is a tonal input, the program flow proceeds to Step S870, and the vocalization symbol string is converted to a Chinese-language character by referencing the character dictionary 42. Then, the program flow proceeds to Step S880, and a determination is made as to whether or not the first candidate character is the desired character. If it is the desired character, the data stored in the buffer 60 is replaced with this character. In Step S890, the value of CtrlVal is set to 0, and single Chinese character inputting is ended. If, in Step S880, it is determined that the first candidate character is not the desired character, the program flow moves to Step S881, and a homonym character is selected. Then, the program flow proceeds to Step S890, the value of CtrlVal is set to 0, and single Chinese character inputting is ended. If, in Step S860, the detected vocalization symbol is not a tonal symbol, the program flow moves to Step S861, and a signal is inputted from the keypad 10. Thereafter, the program flow returns to Step S800.

Figure 9:
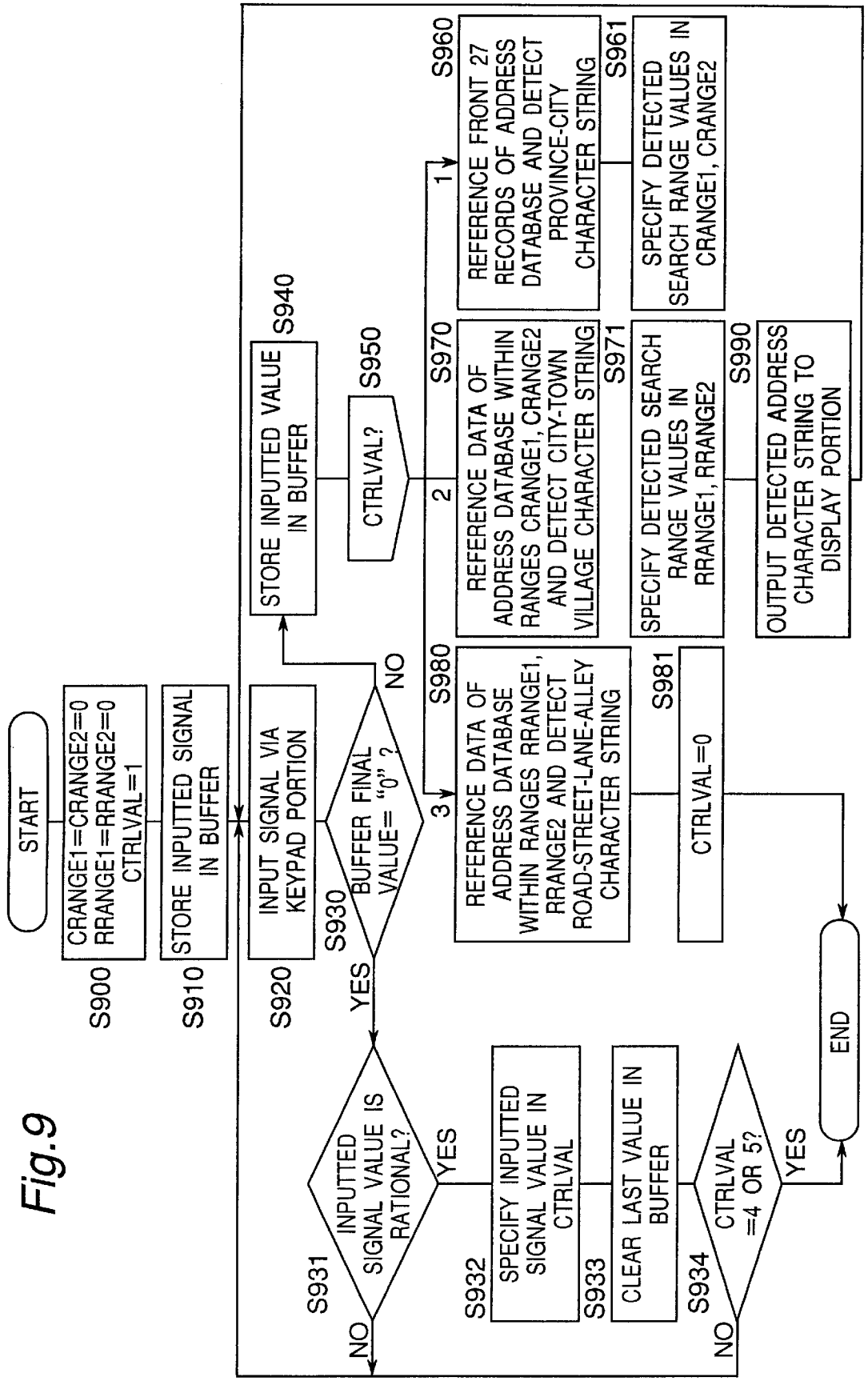
FIG. 9 is a flowchart for an address data processing portion in the above-mentioned aspect of the embodiment.
Figure 10:
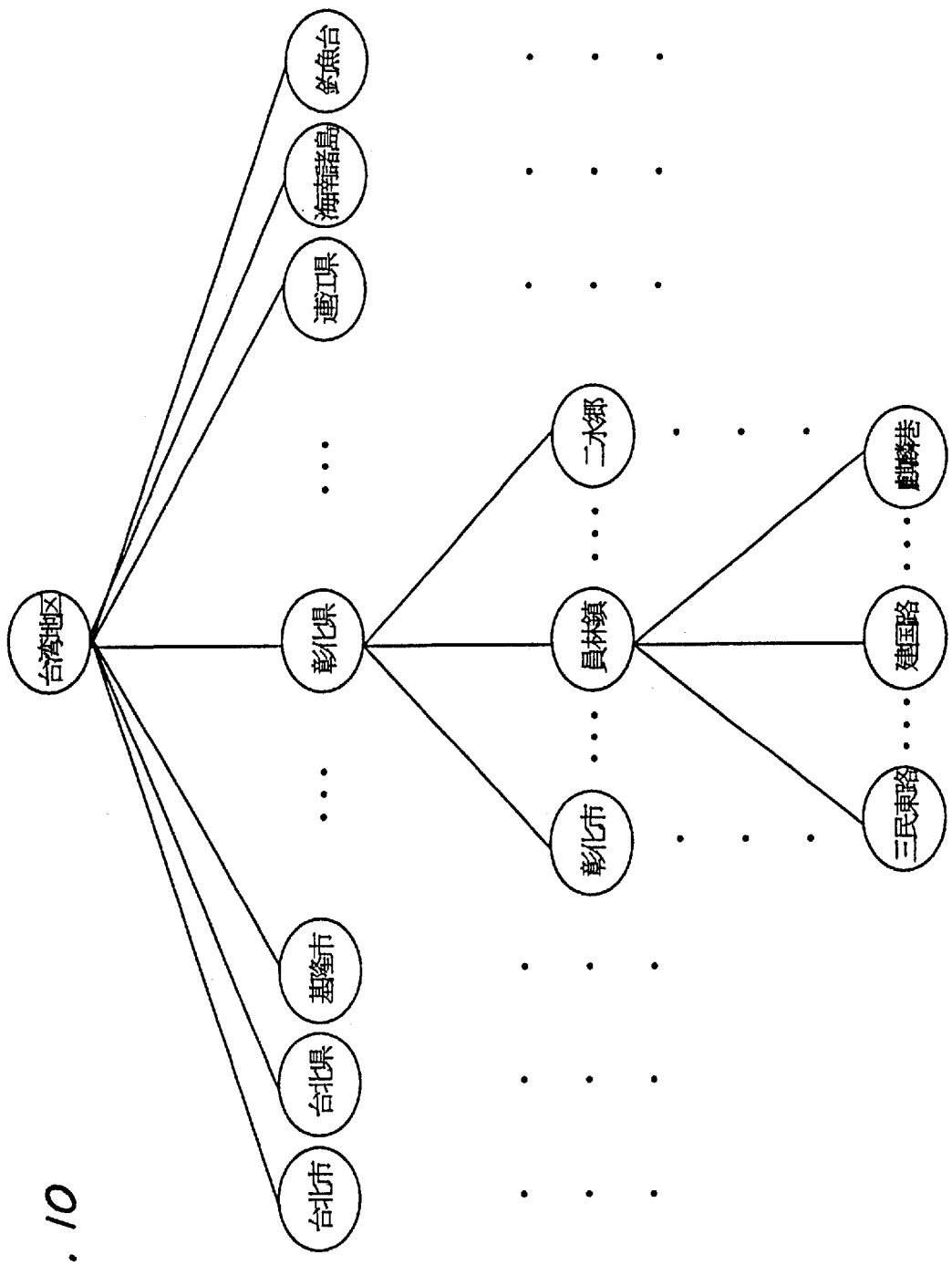
FIG. 10 is a diagram showing a hierarchical relationship of address data in the above-mentioned aspect of the embodiment.
Figure 11:
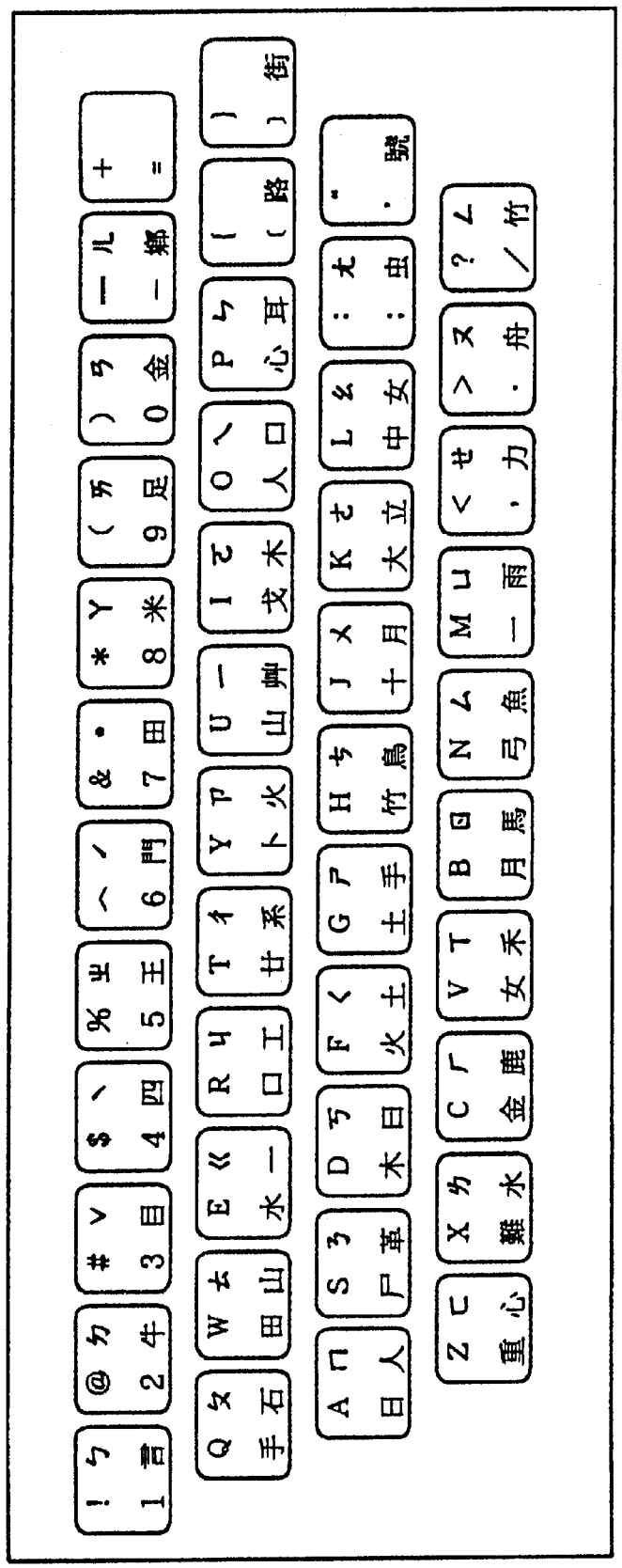
FIG. 11 is a diagram showing a general-purpose keyboard in a conventional example.

Here, the processing flow of the address data processing portion 50 will be explained by referring to the flowchart of FIG. 9. In Step S900, city-town-village, and road-street-lane-alley search ranges (that is, CRange1, CRange2, RRange1, RRange2) are set to 0, and CtrlVal is set to 1. This indicates inputting from province-city data. In Step S910, an inputted signal is stored in the buffer 60. In Step S920, a signal is inputted from the keypad 10.

In Step S930, a determination is made as to whether or not the last value in the buffer 60 is "0". If it is 0, the program flow proceeds to Step S931, and a determination is made as to whether or not the value of the inputted signal is rational. At this time, the following circumstances are considered rational. A determination of rational is made when (1) the inputted signal value is either 4 or 5, (2) when CtrlVal=1, there are specified values in CRange1, CRange2, and the value of the inputted signal thereof is "2", and (3) when CtrlVal=2, there are specified values in RRange1, RRange2, and the value of the inputted signal thereof is "3".

If the value of the inputted signal is rational, the program flow proceeds to Step S932, and the value of the inputted signal is specified in CtrlVal. Then, the program flow moves to Step S933, and the last value in the buffer 60 is cleared. Next, the program flow proceeds to Step S934. In Step S934, a determination is made as to whether the value of CtrlVal is 4 or 5. If it is 4 or 5, address data inputting is ended, and the system switches to another inputting mode. Otherwise, the program flow returns to Step S920.

If, in Step S930, it is determined that the last value in the buffer 60 is not "0", the program flow moves to Step S940, and the inputted signal is stored in the buffer 60. Then, in Step S950, the value of CtrlVal is determined. If it is 1, the program flow proceeds to Step S960, a province-city character string is detected by referencing the data of 27 records of the front of the address database, and checking the same against the address code string stored in the buffer 60. In Step S961, the detected search range values are specified in CRange1, CRange2. Thereafter, the program flow moves to Step S990, and the detected address character string is outputted to the display portion. If, in Step S950, the value of CtrlVal is determined to be 2, the program flow moves to Step S970, and a city-town-village character string is detected by referencing the data of the address database within the range of CRange1, CRange2, and checking the same against the address code string stored in the buffer 60. Then, the program flow proceeds to Step S971, and the detected search range values are specified in RRange1, RRange2, respectively. Thereafter, the program flow moves to Step S990, and the detected address character string is outputted to the display portion. In Step S950, when the value of CtrlVal is determined to be 3, the program flow moves to Step S980, and after a road-street-lane-alley character string is detected by referencing the data of the address database within the range of RRange1, RRange2, and checking the same against the address code string stored in the buffer 60, the data stored in the buffer 60 is replaced. After CtrlVal is set to 0 in Step S981, address inputting is ended.

Next the processing of this aspect of the embodiment will be explained in more detail in accordance with the actual examples of hereinbelow. Specifically, this operation will be explained using the address "台北県板 橋市英士路 1 2 3 号 (Taipeihsien, Panch'iaoshih, Yingshihlu 123go)" as an example. First, initial values are set in register CtrlVal and the buffer 60 by the controller 20. Next, "01" is inputted from the keypad 10. When, after receipt of the inputted signal "01", the controller 20 determines the inputting mode thereof as being province-city in the address inputting mode, the program flow moves to the address data processing portion, and address processing is performed.

Then, the user inputs "221134" from the keypad 10. Once the final "4" has been inputted, the character string "台北県 (Taipeihsien)" is detected from the address database 51, and replaces a code string in the buffer 10. And then, the character string "台北県 is outputted to the display portion 70, and displayed. Next, "02" is inputted. This time, in accordance with a determination of the address data processing portion 50, the range of the inputted data is city-town-village address data. Thereafter, the user inputs "112435" in accordance with the keypad 10. When the final "5" has been inputted, the character string of "板橋市 (Panch'iaoshih)" is detected from the address database 51, and after the same replaces the code string in the buffer 60, the character string "板橋市 thereof is outputted to the display portion 70 and displayed.

Next, "03" is inputted. This time, in accordance with a determination of the address data processing portion 50, the range of the inputted data is road-street-lane-alley address data. Thereafter, the user inputs "173542" from the keypad 10. After the final "2" has been inputted, and the character string of "英士路 (Yingshihlu)" is detected from the address database 51, address data processing is ended. Thereafter, the character string of "英士路 which is stored in the buffer 60, is fetched by the controller 20, outputted to the display portion 70 and displayed. Next, when "04" is inputted from the keypad 10, after receiving the inputted signal "04", the controller 20 determines the inputting mode thereof to be the numerical inputting mode.

Thereafter, the program flow proceeds to the numerical processing portion 30, and numerical processing is performed. In accordance with the keypad 10, "11" is inputted. This indicates the numeral "1" has been inputted. Then, after the program flow returns to the controller 20, the same is outputted to the display portion 70. At this point, since CtrlVal is likewise determined to be the numerical inputting mode of "4", numerical processing is once again performed by the numerical processing portion 30. In accordance with the keypad 10, "22" is inputted. This indicates the inputting of the numeral "2".

Next, after the program flow returns to the controller 20, the results thereof are outputted to the display portion 70. At this point, since CtrlVal is likewise determined to be the numerical inputting mode of 4, numerical processing is once again performed by the numerical processing portion 30. In accordance with the keypad 10, "33" is inputted. This indicates the inputting of the numeral "3". Then the program flow returns to the controller 20, and the results thereof are outputted to the display portion 70.

Thereafter, "05" is inputted in accordance with the keypad 10. Since this is determined by the controller 20 to be the single Chinese character inputting mode, the program flow moves to the single Chinese character processing portion 40, and single Chinese character processing is performed. When "333944" is inputted in accordance with the keypad 10, the single Chinese character processing portion 40 references the key signal/voice symbol lookup table in accordance with every two key signals, and detects a vocalization symbol, which corresponds thereto. First, in accordance with the input code "33", the symbol "ㄏ" is detected, and outputted to the display portion 70.

Thereafter, in accordance with input code "39", the above-mentioned symbol "ㄠ", is detected, and outputted to the display portion 70. And then, in accordance with input code "44", the above-mentioned symbol "台北県" is detected, and outputted to the display portion 70. In this case, when it is determined that the tonal symbol represented by the above-mentioned symbol "台北県" has been inputted, upon referencing the character dictionary 42, and converting the vocalization symbol string to the character "号 (go)", the data stored in the buffer 60 is replaced, and single Chinese character inputting is complete. Then, after the program flow returns to the controller 20, the results thereof are outputted to the display portion 70. The inputting of 1 record of address data is completed in this manner.

Furthermore, the present invention is not limited only to the above-mentioned embodiment, but rather can be suitably transformed and applied in a scope that does not alter the gist of the invention. For example, the corresponding relationship of the key signal/voice symbol lookup table is not limited to one like that of FIG. 3. The address database storage system can also be altered. Further, addresses are not limited to the Taiwan region. That is, the present invention can be applied to regions, for example, the China mainland, that have the same hierarchical relationship as the address of Taiwan.

As described above, it is clear that with the present invention, when inputting via a keyboard "台北県 for example, it is enough to simply press 6 keys, whereas in accordance with the Han-yin inputting method, 10 keys must be pressed, and if it is a numeric key-based Chinese character voice inputting method, 17 keys must be used.

According to the present invention, the problems inherent in the prior art can be solved, and the hereinbelow effects can be achieved.

That is, Chinese-language characters can be inputted quickly using only 10 numeric keys "0" to "9". Consequently, the present invention can be applied to all devices that have the 10 numeric keys "0" to "9". For example, it can be applied to PDAs, and the remote controllers of television sets and audio products. Since each vocalization symbol is defined by 2 numeric codes, the rules corresponding thereto are simpler, clearer, and easier for the user to remember.

Further, an address database is prepared in accordance with a hierarchical relationship, and the address database is searched in accordance with a method which assigns 2 codes to 1 character. For this reason, in addition to making it possible to shorten the time for detecting address data, it is also possible to reduce occasions on which a homonym is selected. According to a numeric key-based Chinese-language address inputting method like this, an address can be rapidly inputted.

Although the present invention has been described in connection with the preferred embodiments thereof with reference to the accompanying drawings, it is to be noted that various changes and modifications are apparent to those skilled in the art. Such changes and modifications are to be understood as included Within the scope of the present invention as defined by the appended claims, unless they depart therefrom.

What is claimed is:

1. A Chinese-language address inputting method for inputting a Chinese-language address in accordance with numeric keys utilizing a device comprising a memory, a display, and a numeric keypad, said Chinese-language address inputting method comprising:

one of inputting, one of a Chinese-language address, a single Chinese character, and a numeral, and controlling the input mode, in accordance with an input convention that comprises assigning all Chinese-language vocalization symbols to numeric keys, with the exception of designating a predetermined key as a control key, assigning consonants to six keys, assigning vowels to one key, assigning rhythm to two keys, and assigning five tonal symbols to five consonant keys, respectively;

determining, in accordance with a user inputted signal, one of a numerical inputting mode, a single Chinese character inputting mode, and an address inputting mode, and controlling processing such that for the numerical inputting mode, processing is performed in accordance with numerical processing, for the single Chinese character inputting mode, processing is performed in accordance with single Chinese character processing, and for the address inputting mode, processing is performed in accordance with address data processing;

the numerical processing comprising outputting the display as a single numeral in response to a numeric key signal that is inputted two times in succession;

the single Chinese character processing comprising storing, in the memory, a key signal/vocalization symbol lookup table created in accordance with the input convention, referencing the key signal/vocalization symbol lookup table each time two numeric keys are inputted in succession, detecting a vocalization symbol corresponding to the inputted numeric key, and then outputting, to the display, the corresponding vocalization symbol, and when a tonal symbol is detected, referencing a character dictionary stored in the memory, and detecting, and then outputting to the display, a Chinese-language character which corresponds to the inputted vocalization symbol;

the address data processing comprising referencing, in accordance with successive user inputted key signals and a predetermined hierarchical relationship, an address database stored in the memory, detecting, and then outputting to the display, a corresponding address character string; and outputting and displaying on the display, a Chinese-language address comprising the characters and numerals detected in accordance with each said processing.

2. The Chinese-language address inputting method according to claim 1, wherein the character dictionary referenced in the single Chinese character processing comprises a vocalization symbol code and a Chinese-language character, and for the vocalization symbol code thereof, the vocalization symbol of a corresponding Chinese-language character comprises two numerals in accordance with the input convention.

3. The Chinese-language address inputting method according to claim 1, wherein the hierarchical relationship of the address data processing divides a Chinese-language address into a superior-subordinate relationship, and a desired Chinese-language address is detected in accordance with the relationship thereof.

4. The Chinese-language address inputting method according to claim 1, wherein the structure of the address database referenced in the address data processing comprises an address code, address character, and subsequent search range, the address code constituting two numeric codes, each two numeric codes representing the first vocalization symbol of each Chinese-language character in a Chinese-language character string of a desired address, the address character comprising a Chinese-language character string of a desired address, and the subsequent search range defines a hierarchical relationship.

5. The Chinese-language address inputting method according to claim 2, wherein the hierarchical relationship of the address data processing divides a Chinese-language address into a superior-subordinate relationship, and a desired Chinese-language address is detected in accordance with the relationship thereof.

6. The Chinese-language address inputting method according to claim 2, wherein the structure of the address database referenced in the address data processing comprises an address code, address character, and subsequent search range, the address code constituting two numeric codes, each two numeric codes representing the first vocalization symbol of each Chinese-language character in a Chinese-language character string of a desired address, the address character comprising a Chinese-language character string of a desired address, and the subsequent search range defining a hierarchical relationship.

7. The Chinese-language address inputting method according to claim 3, wherein the structure of the address database referenced in the address data processing comprises an address code, address character, and subsequent search range, the address code constituting two numeric codes, each two numeric codes representing the first vocalization symbol of each Chinese-language character in a Chinese-language character string of a desired address, the address character comprising a Chinese-language character string of a desired address, and the subsequent search range defining a hierarchical relationship.

* * * * *